US012662367B2

(12) United States Patent
Agostini

(10) Patent No.: US 12,662,367 B2
(45) Date of Patent: Jun. 23, 2026

(54) AUTOMATIC DISPENSING SYSTEM FOR LIQUID SAMPLES

(71) Applicant: Leandro Jose Agostini, Porto Alegre (BR)

(72) Inventor: Leandro Jose Agostini, Porto Alegre (BR)

( * ) Notice: Subject to any disclaimer, the term of this patent is extended or adjusted under 35 U.S.C. 154(b) by 421 days.

(21) Appl. No.: 18/289,272

(22) PCT Filed: Sep. 6, 2021

(86) PCT No.: PCT/BR2021/050382
§ 371 (c)(1),
(2) Date: Nov. 2, 2023

(87) PCT Pub. No.: WO2022/261734
PCT Pub. Date: Dec. 22, 2022

(65) Prior Publication Data

US 2024/0253972 A1 Aug. 1, 2024

(30) Foreign Application Priority Data

Jun. 16, 2021 (BR) ........................ 102021011665-0

(51) Int. Cl.
*B67D 7/78* (2010.01)
*B44D 3/08* (2006.01)
(Continued)

(52) U.S. Cl.
CPC ................. *B67D 7/78* (2013.01); *B44D 3/08* (2013.01); *B67D 7/42* (2013.01); *B67D 7/62* (2013.01)

(58) Field of Classification Search
CPC ... B67D 7/78; B67D 7/42; B67D 7/62; B44D 3/08; G01F 13/00; G05D 11/02
See application file for complete search history.

(56) References Cited

U.S. PATENT DOCUMENTS 6,457,496 B1 * 10/2002 Chuang .................. B65B 43/60
141/144
8,528,781 B2 * 9/2013 Sacchet ................ F04C 2/1071
222/138
(Continued)

FOREIGN PATENT DOCUMENTS

CN 2706224 Y 6/2005
WO 0013918 A1 3/2000
(Continued)

OTHER PUBLICATIONS

International Search Report and Written Opinion with mailing date of Feb. 28, 2022, 4 pages.

*Primary Examiner* — Justin Holmes
(74) *Attorney, Agent, or Firm* — Berg Hill Greenleaf & Ruscitti LLP

(57) ABSTRACT

Automatic system for precisely dispensing small quantities of colorings with individual pumping for each receptacle (canisters). Each canister (6) has a stirring blade (2). Fastened to the bottom (6) is a corrugated tube (41), the inlet channel for the pump (50). A spider connects the shafts of the blade (2) and is driven in rotation by a direct-current motor (43). Several pumps (50) connect to hoses (42) leading to the dispensing nozzles (8). Each nozzle (8) has staggered holes for the interference fitting of the dispensing hoses (42). A semi-circular movement mechanism comprises four arms (12 and 13) that articulate side supports (9 and 11) and move a receptacle support (44). An electronic circuit board (51) has a customizable resolution for each pump, precisely adjusting the dispensed fluid. An electronic processing and communication device provides the human-machine interface.

12 Claims, 14 Drawing Sheets

(51) Int. Cl.

| | |
|---|---|
| ***B67D 7/42*** | (2010.01) |
| ***B67D 7/62*** | (2010.01) |

(56) References Cited

U.S. PATENT DOCUMENTS

| | | | | |
|---|---|---|---|---|
| 2003/0146244 | A1* | 8/2003 | Sanders .................. | G01F 11/22<br>222/333 |
| 2007/0044863 | A1 | 3/2007 | Engels et al. | |
| 2018/0361332 | A1 | 12/2018 | Chen et al. | |

FOREIGN PATENT DOCUMENTS

| | | | |
|---|---|---|---|
| WO | 2012104723 | A1 | 8/2012 |
| WO | 2018009764 | A1 | 1/2018 |
| WO | 2020165928 | A2 | 8/2020 |

* cited by examiner (b)

(a)

AUTOMATIC DISPENSING SYSTEM FOR LIQUID SAMPLES

CROSS-REFERENCE TO RELATED APPLICATION

This application is a national stage application under 35 U.S.C. 371 of PCT Application No. PCT/BR21/50382 having an international filing date of Sep. 6, 2021, which designated the United States, which PCT application claimed the benefit of Brazil application Ser. No. 10/202, 1011665-0, filed Jun. 16, 2021, both of which are incorporated by reference in their entirety. #

FIELD OF THE INVENTION

The present invention pertains to the technological sector of liquid-dispensing systems, more specifically it refers to an automatic dispensing system for samples of small volumes to be used, for example, by the tintometric industry by means of equipment endowed with independently-driven hydraulic circuits. The invention enables accurate dispensing into small-volume empty receptacles, in the form of a compact, easy-to-operate machine.

STATE OF THE ART

Automatic dispensers are tintometric equipment items which, by means of an integrated or external computer, store the paint manufacturer's formulae base and dispense colorings, bases and other products without the operator being responsible for controlling quantities.

Positive displacement pumps are mainly applied in these dispensers, which dispense the same quantity per cycle or revolution. Today, piston pumps are used, as are bellow pumps, gear pumps, progressive cavity, and others, endowed with controlled drive, that is, using step motors, servos or encoders, which monitor their positioning and control the volume dispensed.

This modality of dispensers shows great productivity and reliability. This are used at high turnover sales points, they are capable of producing paints in small packages, traditionally called "quarts", within seconds and large packages, such as gallons and cans, within a few minutes.

However, automatic dispensers are not used for dispensing paint samples into small-volume empty packages owing to limitations in their systems, not enabling dispensation on a microliter scale for colorings and, in the vast majority thereof, do not have the functionality of dispensing bases.

Among the pumps used in dispensing machines, the progressive cavity one stands out. This pump, also called BCP, is classified as a positive displacement pump (also called volumetric). This pump is a variation of the single-screw pump, being comprised of a helical screw rotor and a natural or synthetic elastomer stator, specified according to the chemical composition and temperature of the fluid to be pumped (HENN, 2006, p. 421 and 422).

In the tintometric application, the pump does not need to provide high pressures to transfer the concentrated coloring from the reservoir of the dispensing machine to the nozzle, assuring operating feasibility thereof with just one pressure stage, decreasing the drive torque, resulting in simplified transmission, assembly, motor capacity, etc. Accordingly, the operating feasibility provides for a more compact constructive form.

Some problems resulting from the traditional constructive form and conception of automatic dispensers include exaggerated size, limited dispensing resolution, limited functionality for dispensing bases, compulsoriness of external computers and low energy efficiency.

The solutions proposed in the state of the art traditionally present large-scale machines with limiting dispensing resolution, making it impossible to dispense small-volume samples and requiring large spaces for the installation and operation thereof.

Novelties and Objectives of the Invention

The system that is the object of the present invention performs precision-dispensing of small quantities of coloring and also of bases of the tintometric system, in their respective proportions through the individual pumping of each product, into an empty receptacle.

The system of the present invention is endowed with reservoirs of colorings and bases, also called canisters, which come in specific sizes so as to confer autonomy in accordance with the application in question.

The interface with the user is by way of an integrated touch-sensitive screen, dispensing the use of external computers for the operation thereof. Even so, it is suitable for connecting external devices for sending orders and other administrative or technical functions as may be useful.

Accordingly, the present invention has the autonomy for full dispensing of paints, meaning that at the end of the dispensing process, the user obtains in the originally empty receptacle all the products that make up the paint, merely requiring a suitable mixer to homogenize the content.

Advantages of the Invention

The automatic dispensing system of liquid samples, the object of the present invention, provides the following advantages over dispensers from the state of the art:

- it is smaller in size and lighter than the dispensers comprised within the state of the art, such that it can easily be accommodated on counters or easy-to-access tables, eliminating the need for a highly dedicated location to place it;
- it presents accuracy and precision for executing formulae containing products with volumes under 0.01 ml in their composition;
- it is classified as a low electricity consumption utensil and dispenses with the use of high-capacity dedicated sockets;
- it has a special functionality for easy homogenization: it dispenses half the volume of the base into the receptacle, then dispenses all the colorings and lastly dispenses the remainder of the base volume.

DESCRIPTION OF THE DRAWINGS

In order that the present invention can be fully understood and put into practice by any person skilled in this technological field, it shall now be described in a clear, precise and sufficient manner, based on the accompanying drawings listed below, which illustrate preferred embodiments of the automatic sample dispenser.

DETAILED DESCRIPTION OF THE INVENTION

Figure 1:
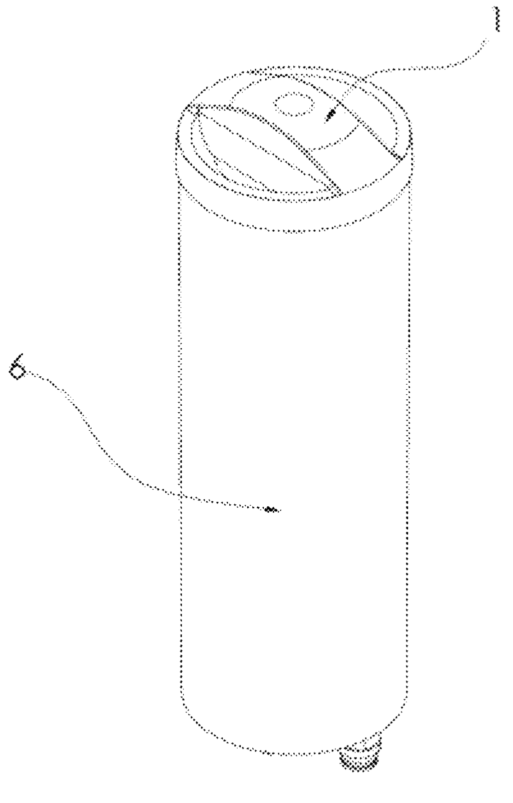
FIG. 1—perspective view of the canister.
Figure 2:
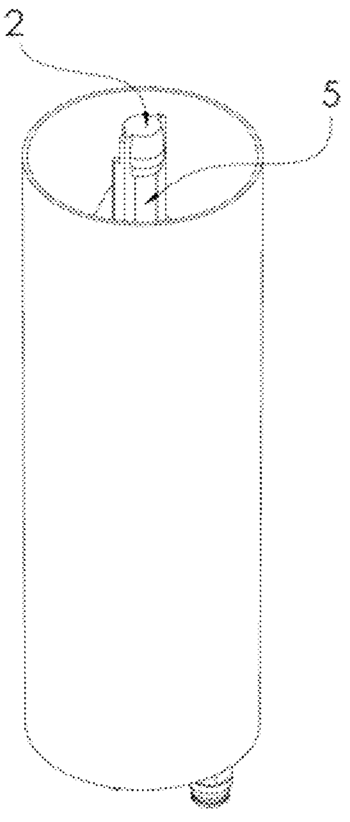
FIG. 2—perspective view of the canister without the cover.
Figure 3:
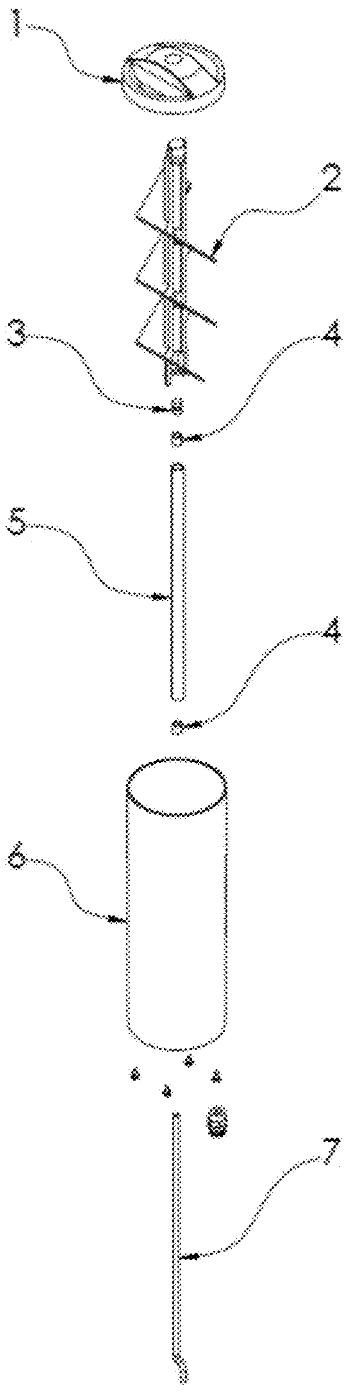
FIG. 3—blown-up perspective view of the canister.

In one standard arrangement, sixteen individual hydraulic circuits, used for pumping colorings and bases, are housed inside the fairing. However, there is no limitation on the total number of circuits, which can be arranged in accordance with each tintometric system, and adjusting the space by altering the total volume of the reservoirs. The circuit is arranged, in simplified form, by the combination of the canister, pump and fluid inlets and outlets and flange nozzles, the pump inlet being a corrugated tube and the outlet, which goes as far as the respective nozzle of the dispenser, a flat tube.

As shown in FIGS. 1-4, the canisters (6) are cylindrical reservoirs of variable height. At the center of its bottom face is a hole with thread where a small diameter tube is mounted, called inner tube (5), from top to bottom, the same height as the canister (6), that is, its upper faces are at the same level at the end once fastened. A metal rod (7) with thread on the upper end is loosely mounted from bottom to top in this tube (5). This thread is fastened onto the stirring blade (2), mounted from top to bottom, outside the small diameter inner tube, through its tubular shaft which is radially comprised of blades for moving the fluid. At the ends of the inner tube (5), two small cylindrical bushings (4) are press-fitted into the internal diameter for improved bearing and guiding of the rod. On the bottom of the canister (6), at the lower face, near its maximum diameter, there is another threaded hole for fastening a quick connection, to which, upon assembly, the corrugated tube (41) connects, which is the inlet of the pump (50). The canister (6) is fastened by four screws at its bottom face which fits into respective pear-shaped holes in the support (39) of the canisters (6) of the fairing, illustrated in FIGS. 9 and 10.

The covers (1) of the canisters (6) are devised with a female lip on the outer circumference so that it fits tightly into the walls of the canister (6). This guarantees the fastening and necessary sealing relative to the outside environment. The cover (1) has a central handle in the form of bump, molded on the surface thereof, to facilitate handling.

The rod of the stirring blade (7) is devised by a round bar, with thread at the upper end and two folds at the lower end. The first fold form a right angle with the longitudinal shaft of the rod and the second forms a right angle with the first, thus having the same direction as the longitudinal shaft. However, becoming eccentric to it. Near this lower end is a through hole that is used in the assembly for inserting a cotter pin.

The stirring blade (2) is formed by a central tubular shaft with blades slanted at 45° spaced along the longitudinal shaft with a certain pitch. This component is obtained by a process of injecting plastic material. At the internal upper end of the central tube is a metal insert (3) with internal thread, which carries out the fastening with the rod of the stirring blade.

Figure 13:
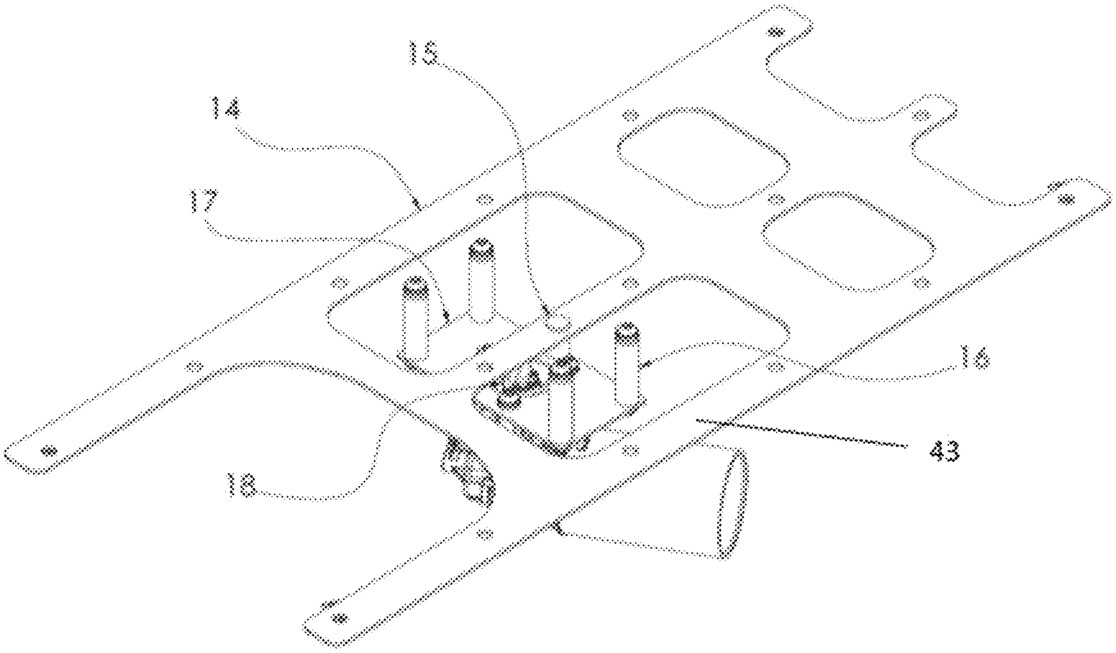
FIG. 13—perspective view of the eccentric stirring system of the canisters.
Figure 14:
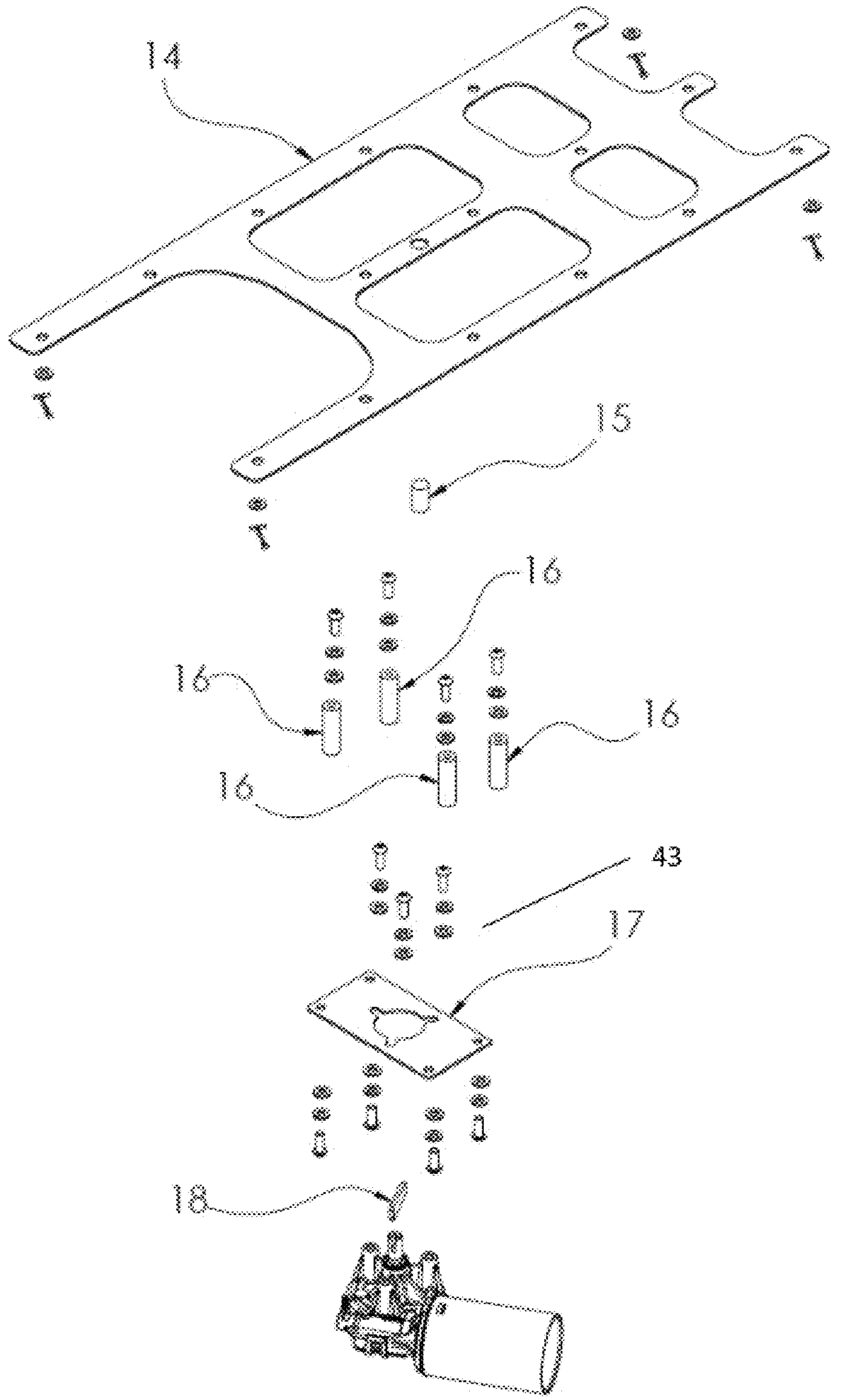
FIG. 14—blown-up perspective view of the eccentric stirring system of the canisters.

The spider is a component which, when mounted, connects to all the lower folds of the rod of the stirring blade. As shown in FIGS. 13 and 14, it is comprised of a plate with various cutouts (14) and holes with a pin (15) welded at the center. This component is mounted from bottom to top in all the rods (7), after fastening the canisters (6) on the fairing. It is therefore located at the lower level of the fairing. After positioning the spider, cotter pins are inserted into the holes of the rods (7) for support. The cutouts in the plate (14), in turn, are positioned so as not to interfere with the corrugated tubes (41) which are the channels that go from the canisters to the pumps (50).

The spider is driven, for eccentric rotary movement, by a direct-current motor (43) with a pawl (18) on its shaft. This pawl tangentially pushes the pin (15) at the center of the spider, making it rotate. The motor (43) is fastened on a metal plate, called motor flange (17), which is fastened on the fairing by four spacers (16). The motor spacers (16) are round, cylindrical bars with threads at both ends for fastening onto the motor flange and chassis.

Figure 9:
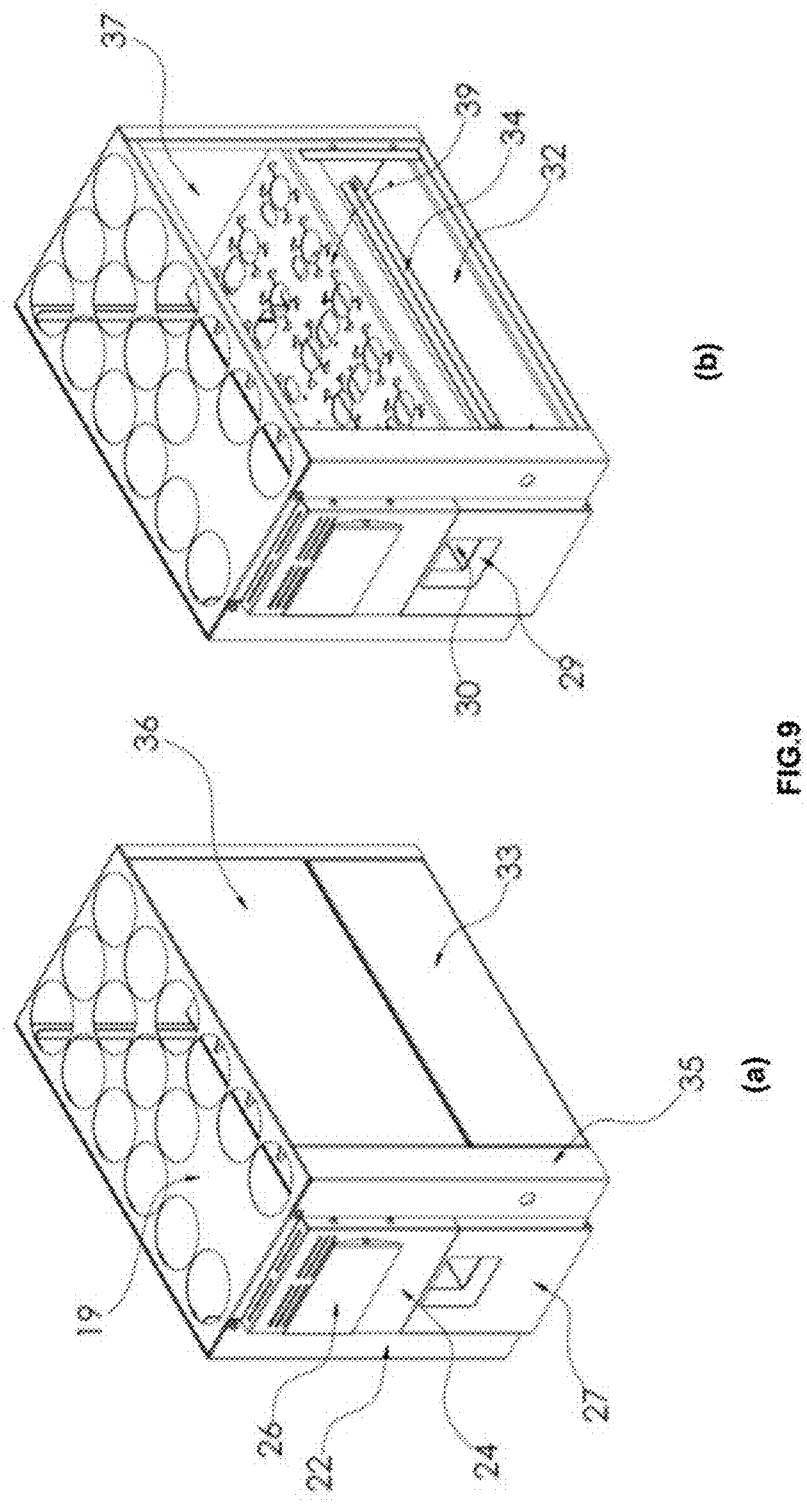
FIG. 9—perspective view of the casing of the dispenser, without the dispensing circuit, with (a) and without (b) the right side cover and without the upper right side crossbar.
Figure 10:
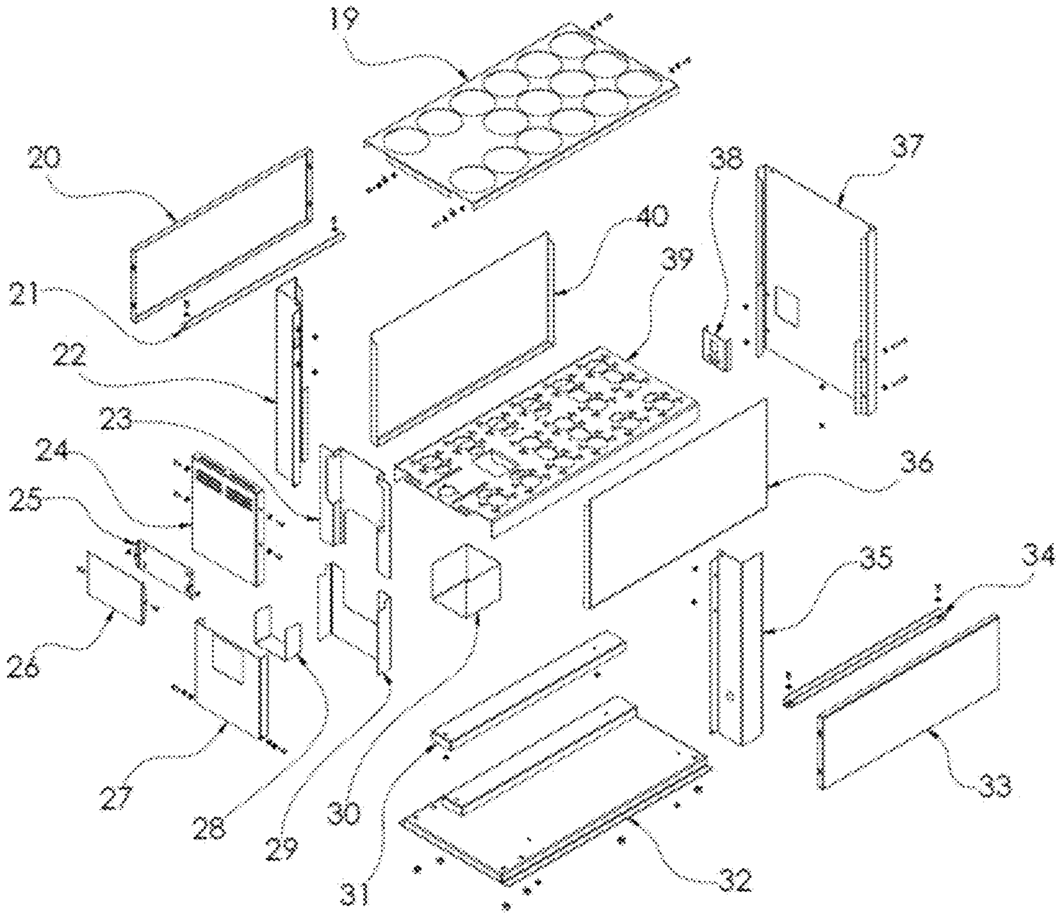
FIG. 10—blown-up perspective view of the dispenser without the hydraulic dispensing circuit.
Figure 11:
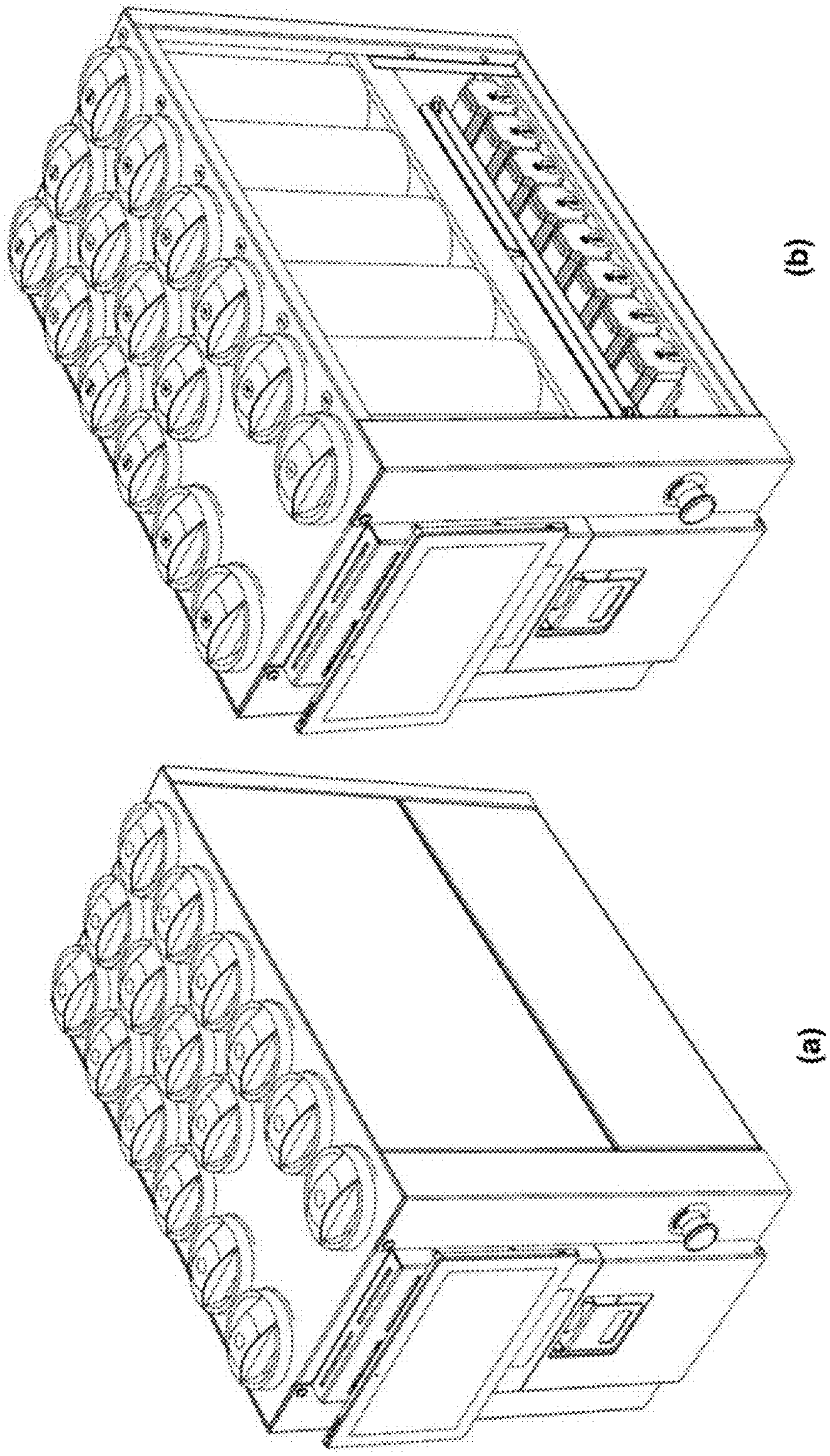
FIG. 11—perspective view of the dispenser, with the dispensing circuit, with (a) and without (b) the right side cover and without the upper right side crossbar.
Figure 12:
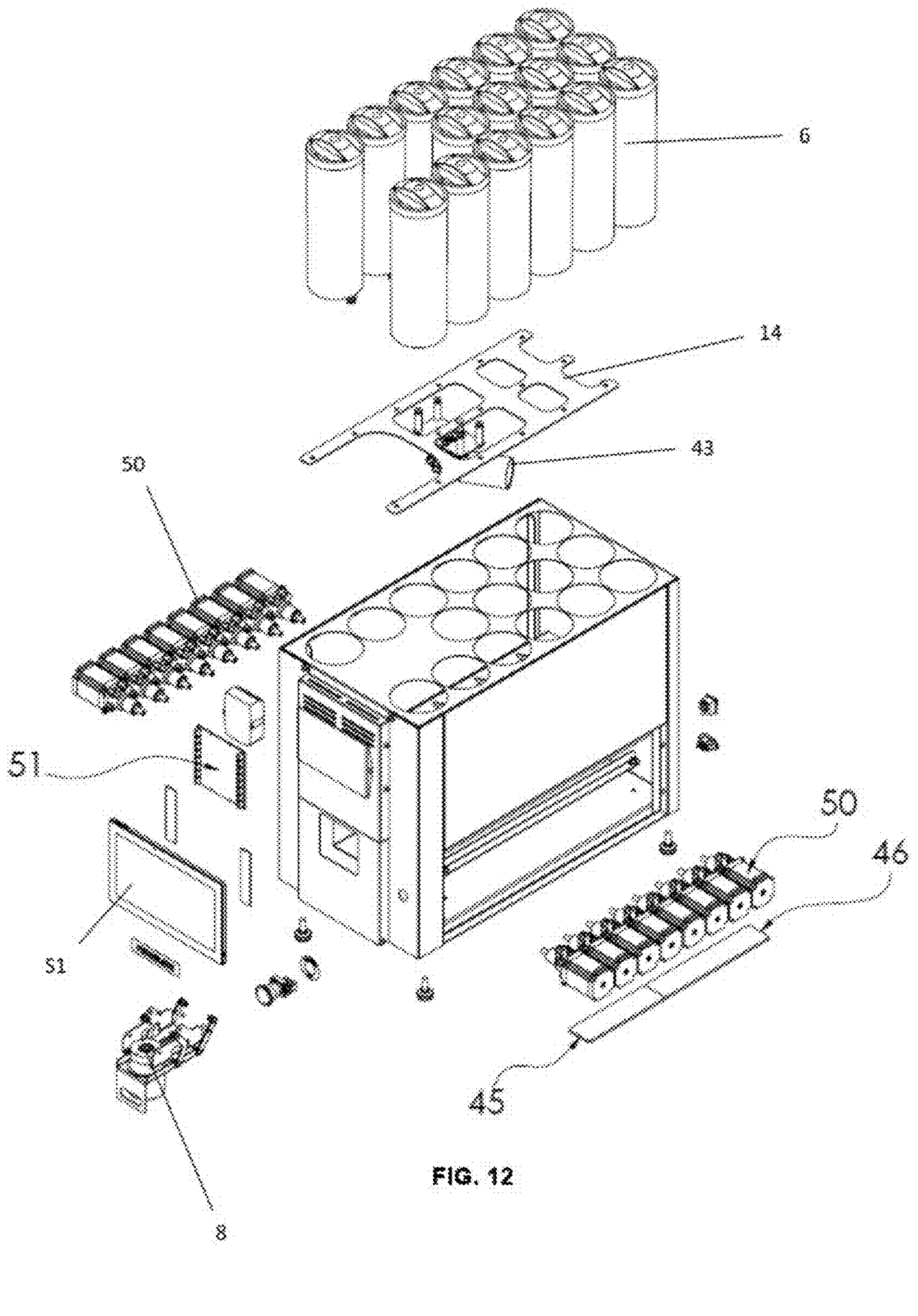
FIG. 12—blown-up perspective view of the dispenser with the dispensing circuit.

Returning to FIG. 4 and assisted by FIGS. 9, 10 and 12, the pumps (50), present in each of the circuits, are described in patent WO2020186324A1. Same are mounted at the back of the fairing (32) and on the wedge of the pumps on the left-hand side (31), on flexible boards (45 and 46) and, placed by side, spaced also by a flexible material. Eight pumps (50) on each side, with the side of the motor facing towards the side covers (20 and 33). Hoses (42) are connected at the outlet of each pump (50) and go as far as the nozzle flange (8), positioning at the front part of the dispenser.

The pump fastening strips (21 and 34) are obtained by a plate folded in the form of a corner, with two oblong holes in one of the tabs, near the ends. These holes act as passage for a screw and to tighten the pumps.

Figure 4:
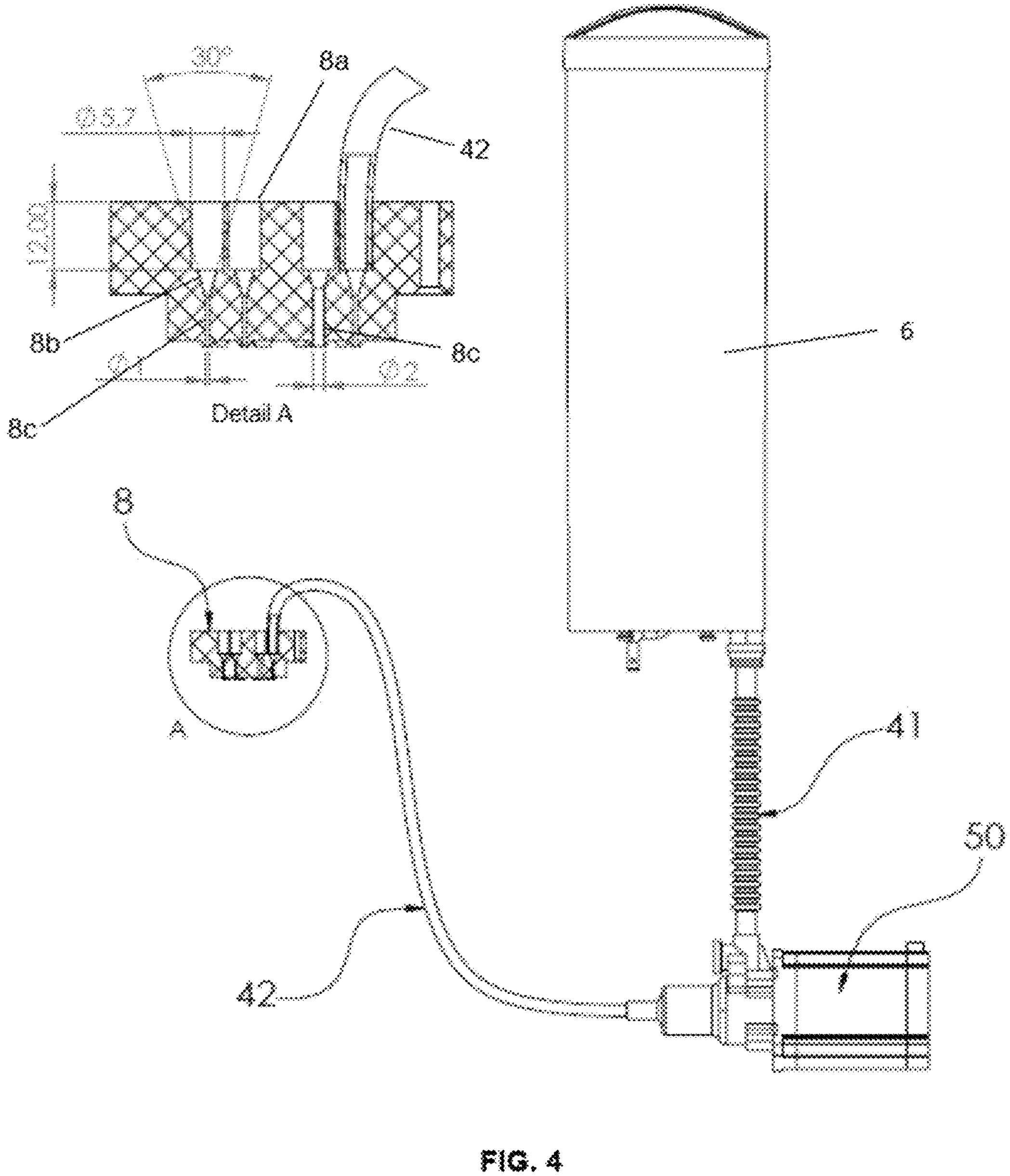
FIG. 4—diagram of the connection of the canister with the pump, highlighting detail A—nozzle flange.
Figure 5:
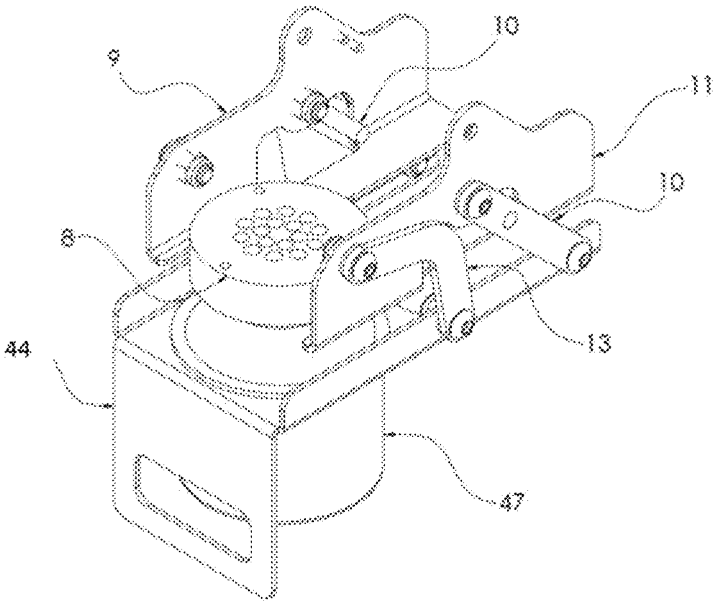
FIG. 5—perspective view of the system supporting the nozzle flange and the support cup.
Figure 6:
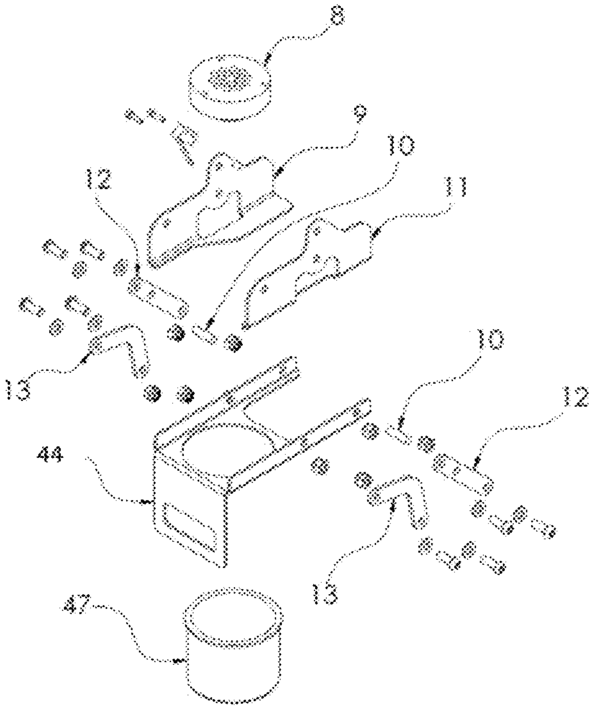
FIG. 6—blown-up perspective view of the system supporting the nozzle flange and the support cup.

FIG. 4 also shows a detail (A) of the nozzle flange (8), illustrating the coupling of the hose (42) in the flange nozzle. Moreover, it shows the geometry of the flange inlet channel (8), which is comprised of a cylindrical portion (**8*a*) with a constant diameter, followed, from top to bottom, by a conical portion (8*b*) with a decreasing diameter and lastly followed by a channel (8*c***). The diameter of the nozzles depends on the properties of the fluid to be moved through the circuit.

The nozzle flange (8), the assembly of which is represented in FIGS. 5-8, has staggered holes, for the interference fitting of the dispensing hoses (42). The holes have specific diameters customized for each product, and well as the cone in each outlet to adjust to the surface tension of each fluid. The flange is fastened on the fairing by means of three screws from bottom upwards.

A mechanism prescribing a semi-circular movement comprises four arms (12 and 13) that articulate side supports (9 and 11) and move a support for the receptacle (44). The front arms (13) are L-shaped and have holes at the ends. The rear arms (12) are linear and have three holes, two at the end and one intermediary, where a pin (10) is welded for subsequently mounting a spring. The support (44) is a folded plate where on the side tables the arm joints (12 and 13) are fastened and on the front tab there is a window that serves as opening for handling with the fingers. On this same support, a large central opening houses a cup (47) for placing receptacles or the sponge cup combination.

Figure 7:
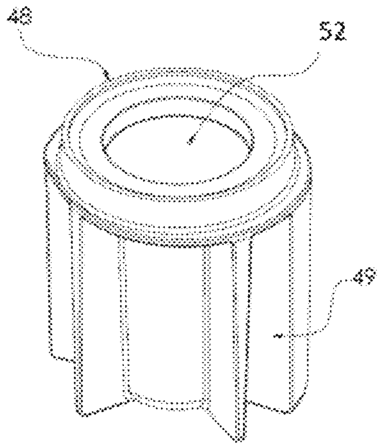
FIG. 7—perspective view of the sponge cup.
Figure 8:
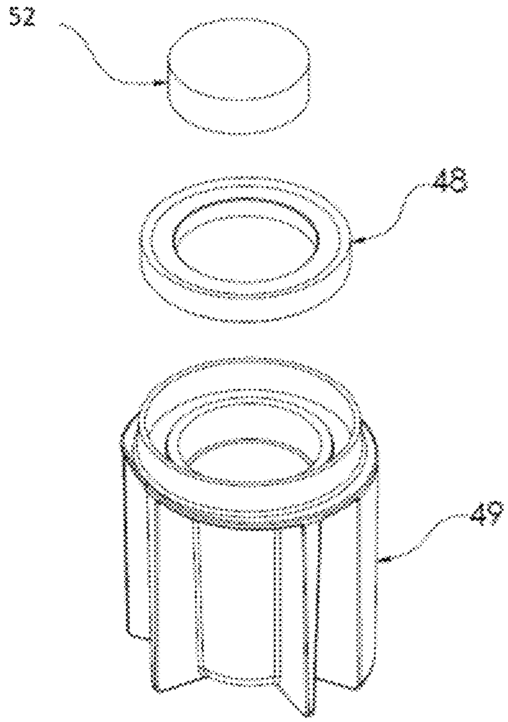
FIG. 8—blown-up perspective view of the sponge cup.

The sponge cup (49), illustrated in FIGS. 7 and 8, is a receptacle with capacity for replenishing water and accommodating a sponge (52) and a sealing ring (48) on the upper part. Its function is to prevent the flange nozzles from drying. This combination is housed in the cup mechanism, inside the support cup (49), which guarantees that when the mechanism is closed, this cup (49) is under the tips of the flange nozzles (8).

As shown in FIGS. 9-12, the dispenser basically comprises a metal casing, called fairing, with canisters (reservoirs of bases and colorings), receptacle support (sample cup), interface touch, electrical interaction buttons and plug for the cable of the socket.

The fairing is mounted modularly. A chassis is formed by welding the various components together. The bottom of the fairing (32) is defined as a plate folded downwards on its four sides and again folded in the four new edges, two outwards and two inwards, so as to create a tab on the lower part. Same has various holes utilized subsequently for fasteners.

Above the bottom, the left-hand pump shim (31) is fastened, a rectangular plate with three edges folded downwards, two longitudinal and the front crosswise.

The rear plate of the fairing (37) is fastened just behind the bottom (32) and the pump shim (31). The rear plate has three consecutive folds on its two vertical edges, two inward and one outward, to provide mechanical strength to the component and fittings for assembly with the other parts. On the same plate, there is a rectangular opening for positioning, from the inside, the plate of the plug and button (38) and other holes for fastening. The plate of the plug and button (38) is a simple rectangular metal support in the form of cover with three tabs and the openings necessary for mounting the components and fasteners.

The left-hand (22) and right-hand (35) columns are mounted on the two front corners of the back of the fairing. These components basically mirror each other, except for the hole for fastening the emergency button, which is positioned on the right-hand column only. These columns basically have an L-shaped cross-section with additional folds on the longitudinal edges, to confer strength and fitting with the other components.

The support of the canisters (39) is a rectangular horizontal plate folded downwards on the two longitudinal edges. This plate has all the openings necessary for positioning and fastening the canisters, nozzle flange and others components afterwards. This component is fastened on the two columns (22 and 35) and on the back plate (37), approximately in the middle of the total height of these components.

The left (9) and right (11) nozzle mechanism supports are small plates folded in L-shape, mirroring each other, with the respective holes and openings for positioning the arms of the mechanism. The base of the "L" is fastened at the front part of support of the canisters (39), bordered by two openings that confer the correct positioning thereof.

In the same position as the supports (9 and 11), but on the side beneath the plate of the canisters, the inner fairing of the nozzle mechanism (30) is fastened. Same is defined as a metal cube, without two faces, forming an L-shaped opening, positioned forwards and upwards.

The upper left (40) and right (36) crossbar is positioned sidewardly on the upper part, above the support plate of the canisters (39). This component has a tab-less cover and one of the four edges. This tab-less edge is positioned upwards in its fastening on the fairing.

Another component is fastened inside at the upper front part to support the mother board (23). Same is obtained by folding a metal plate which is sidewardly fastened on the two columns (22 and 35) and, in the lower part, on the support of the canisters (39). This component has holes for fastening the board, as well as cutouts at specific sites for the passage of cables that go to the motors of each pump.

Further in the front part, but below, is the internal front panel (29) which fills the gap between the columns (22 and 35), the support of the canisters (39) and the internal fairing of the nozzle mechanism (30).

The lower front panel is obtained by joining two metal plates, the panel frontal (27), which has two side folds, making its cross-section long-based U-shaped, with a central rectangular opening, where another U-shaped plat is fastened internally, the outer fairing of the nozzle mechanism (28) forming a side and lower protection at this opening.

The upper front panel (24) is comprised of a plate folded on three sides, forming a three-edged cover, one upper and two side covers. This plate has oblong-shaped openings on the upper part of the front face and on the upper tab. The rear support of the tablet (25) with two side fins is fastened on the front face of this front panel (24). This support has one cross hole in each fin, where bolts are welded on the inner side.

The upper cover (19) is presented as a plate with sixteen circular cutouts in the size of the canister, with four edges folded downwards. The front tab has two side cutouts, being restricted solely to the central region except for two small supports near the side ends. These have holes where bolts are welded for fastening on the fairing. The rear tab also has two holes for welding two bolts.

The left (20) and right (33) side cover is a plate with four folded tabs. The side tabs have two openings, each rectangular in shape. These openings are used fastening thereof on the fairing, which are pierced by screws.

The support of the tablet (26) is obtained by folding two small side tabs on a simple plate. These tabs each have a small hole for fastening this component onto the upper front panel (24).

As described, the fairing has two levels, the pumps and stirring mechanism being mounted on the lower level. The canisters, source, upper cover, etc., are fastened on the upper level. The components are fastened by way of fittings, velcros, magnets and metric thread screws, each for its respective component.

At the front part of the fairing, electric buttons for tuning on and off are positioned and also the emergency button, pursuant to the electrical safety norms currently in place. In the upper part of the panel, the integrated touch tablet receives electric power coming from the source and its connection with the control boards is by way of wireless protocols, such as bluetooth and wi-fi.

The electronic board (51), developed especially for this application, is accommodated and fastened by means of screws onto the central upper board of the chassis. This board manages the closing sensors of the cup mechanism, of the motors of each pump and provides input for over ten sensors as and when needed. This board has customizable resolution for each pump, and the movement of these motors can be adjusted with extra precision and, consequently, the quantity of dosed fluid.

Figure 15:
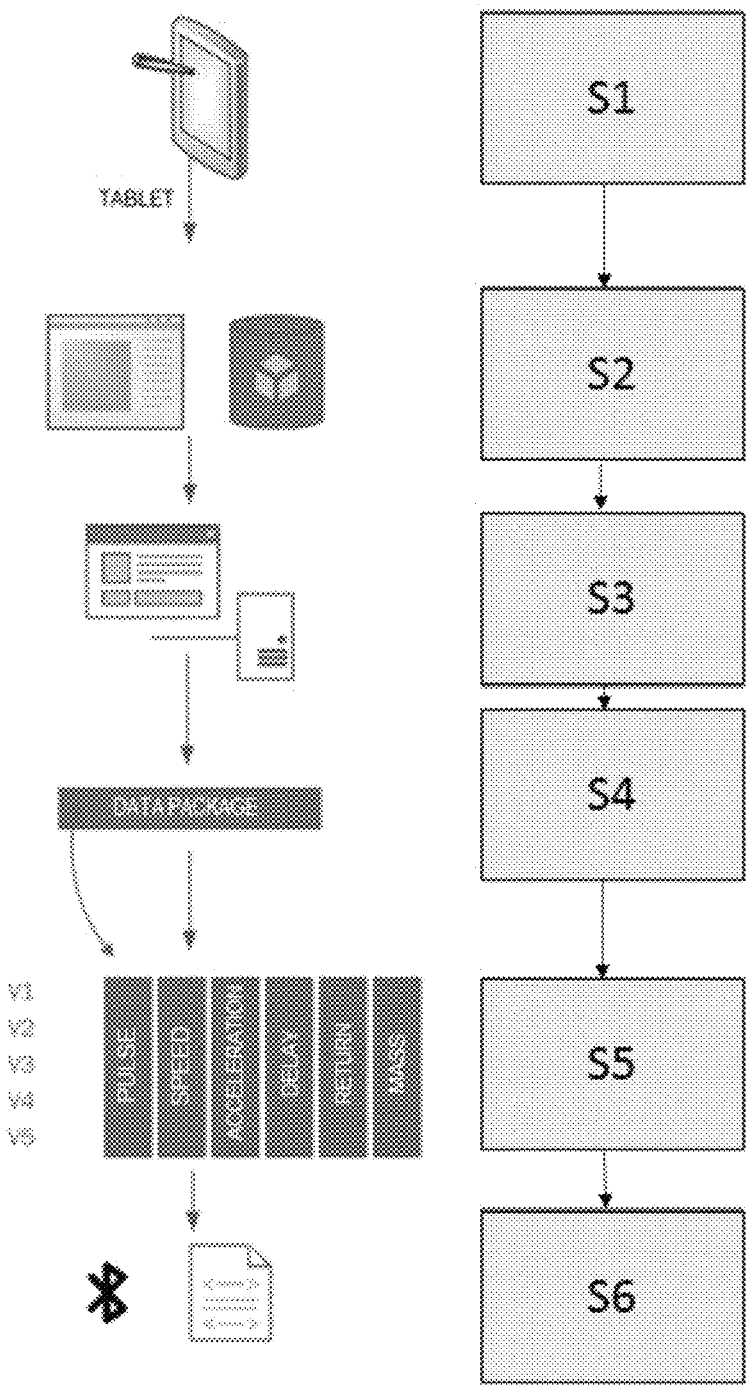
FIG. 15—flowchart of the software of the automatic dispensing system.

In the descriptive flowchart of the software (FIG. 15), the user interaction device (TABLET) is in charge of the MMI (human-machine interface, S1) facilitating user interaction in an easy-to-operate virtual environment, with data in customizable units according to consumer needs, such as volume in milliliters, liters, ounces, or mass in grams. The frontend (S2 interface with the user) provides a text file, with a certain extension (.dat, for example), in a folder where the backend (S3) can collect this data.

The frontend (S2) is for interaction with the user and stores the information on dispensing recipes, called database. It is possible to manage recipes therein, edit them, exclude them or create new recipes. Trivially, this is where the user chooses the recipe he or she wishes to dispense, along with the volume, or receptacle. The frontend has administrative and financial functions when, used by the user, such as inventory control, price of products, etc.

The backend (S3) has all the configuration areas available for the machine, and can only be accessed by an authorized technician, wherein it is possible to configure all the parameters of the machine, rate and communication, automatic purging drives, pump calibration, and administrative configurations. It is also in charge of making the communication between the frontend and the dispenser, converting data into milliliters (ml) for control units used by the control board. It captures the data provided by the frontend by way of a .DAT file and carries out the dispensing process.

On receiving data from the software frontend (S2), the backend (S3) finds the best calibration range of the pumps and adjusts (S4) the dispensing through a linear interpolation (S5) and specifies the data to send to the control board of the dispenser via wireless (bluetooth/wi-fi) (S6).

In the calibration, the parameters are filled in and calculated for each pump, in accordance with the characteristics of the fluid to be dispensed. The data (S5) are pulses (of the step motor) to move the pump (quantity to be dispensed), speed (pulses/sec.) to the dispensing, acceleration (pulses/sec.$^2$) to attain the desired speed, time (milliseconds) that the pump will not move until the reverse movement begins, reverse pulses (pulses) that carry out the movement contrary to dispensing, preventing drips and undue dispensing, specific ideal mass (grams) of the coloring in that quantity to be dispensed, mass (grams) measured upon calibrating the machine and diversion (%) between the specific and measured mass (combination of data S5). This data is measured in different dispensing quantities, and changes for each situation, generating the work ranges and, accordingly, the dispenser has data for calculating the dispensing received by the front-end.

Put plainly, the calibration is the repetition of the dispensing and automatic adjustment of the pulses, speed and acceleration by the software, until the convergence of the quantity dispensed in the admissible diversion range. The flexibility for adjusting all these parameters is primarily responsible for the accuracy and capacity to dispense small volumes with accuracy and precision.

Point-to-point topology is utilized in the communication (S6), along with the protocol modbus RTU (master-slave), the backend being the master and the controller board (H6) the slave.

Figure 16:
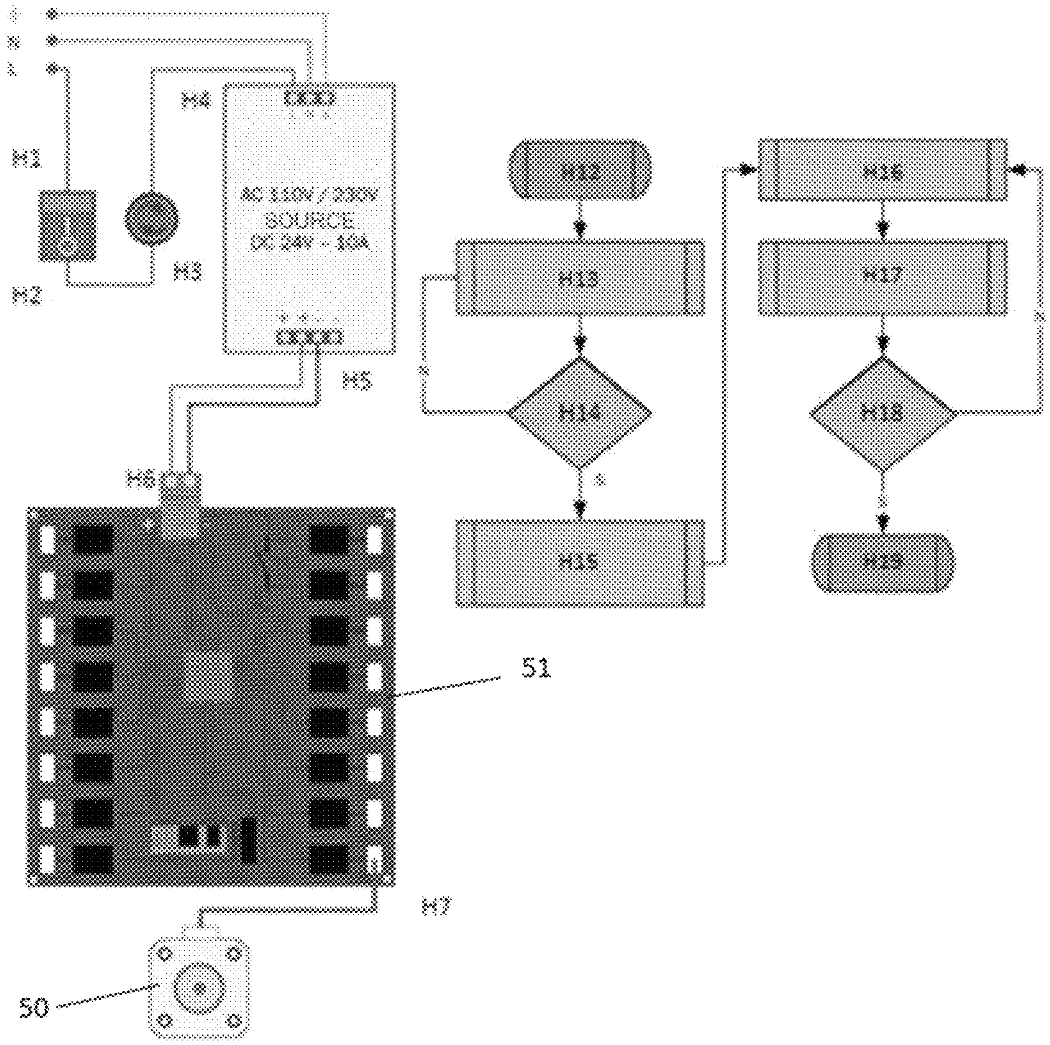
FIG. 16—block diagram of the workings of the hardware of the automatic dispensing system.

According to FIG. 16, before beginning the dispensing (H12), a status request (H13) is send to the controller which informs whether or not it is capable of carrying out the command and whether the receptacle is in position (H14). If the sensor does not detect the receptacle, the controller (51—electronic board) informs the backend (S3), and it requests the insertion of the receptacle for dispensing to be permitted.

With the controller (51) capable of carrying out the command, the backend (S3) sends the pulse quantity data for dispensing (position), speed, acceleration, delay and return, to each motor (H15). The board (H6) interprets (H16), informs that the data was successfully received and begins the control of the drivers (H17).

The control board (51) can make individual or simultaneous dispensing (more than one pump, in accordance with the dispatch of data from the backend—S3).

In the individual dispensing, the backend (S3) only informs the dispensing of one coloring, the control board receives this data and begins the control process, sends to the driver of the pump the quantity of pulses for the motor, direction of the movement (dispense or reverse) and the speed at which it should carry out the movement. When the movement is carried out to the dispensing position, the board begins the delay time to reverse, where it turns off the motor power for the waiting time, and when time has elapsed, it turns on and carries out the reverse movement. The movement being terminated, the board informs that dispensing is completed.

In simultaneous dispensing, the backend (S3) informs the pumps that will be dispensed. To illustrate, seven colorings will be used. The backend (S3) sends the parameters to the seven colorings, the controller can manage up to five pumps simultaneously. It groups the dosages from largest to smallest (quantity to be dispensed) and carries out the first five, in the same way as it controls when individual, since of these five dosages, when the one with the smallest quantity has been completed, the controller begins the next greatest dosage in the queue, always to keep the maximum number of motors running. Once the seven motors have been completed, the controller informs the conclusion of the dispensing.

During management of the dispensing, simultaneous or individual, the backend communicates with the controller requesting the status, completed or in progress. Once the status has concluded, it shuts off the dispensing and informs that the dosage has finished.

The control board (51) uses specific drivers (H17) for controlling the movement of the pump motors. Using one driver per pump, the board controls (51) them with some basic signals, as follows: pulse, micro step, direction and enable.

The pulse is the signal utilized for controlling the position and speed at which the motor moves the pump. The motor comes with the constructive characteristic of 200 pulses per revolution, with each pulse the motor moves its shaft by 1.8° (200*1.8=360°), so for 1 complete revolution, the controller has to send 200 pulses, the speed at which the controller sends these pulses is what results in the speed at which the pump will move, if these pulses are sent at 200 pulses per second, it will take 1 second to make a full revolution. Acceleration is used for the speed to be attained gradually, helping to break the inertia. Position, speed and acceleration are controlled by the pulse signal which is generated by the controller.

Micro step is the characteristic that the the driver of the step motor has to increase the number of possible angles for the motor to position itself, naturally having 1.8° per step, when we use a micro step of 2, we are dividing this 1.8°/2 which gives us 0.9° per pulse, the controller uses the micro step of 2 to increase the number of possible positions, for this it needs 400 pulses to give a full revolution (0.9° *400=360°) this is necessary to have more precise control of the positioning of the rotor inside the pump.

The Direction is the signal that informs the driver in which direction the motor will move, being clockwise or counter-clockwise, dispensing or reverse and the Enable, signal that informs the driver when to power up the motor.

The electric energy reaches the dispenser by a d-type tripolar power cable, containing phase, neutral and earth. Next to the machine's power socket (H1) is a hold button responsible for whether or not to power the dispenser (H2), since it cuts all AC power to the machine.

After the main switch (H2), the phase cable passes through an emergency button (H3), which is normally turned off, upon being activated it opens up the circuit and cuts the power supply for the rest of the machine.

After the emergency, the phase cable and the neutral cable, it connects the primary AC input (alternating current, H4) of the 24V/10 A source and to the timer in charge of driving the stirring motor (H11).

The control board (51) receives the 24V and distributes among the drivers, they become capable of powering up the motors, as soon as the board receives the command to dispense.

Figure 17:
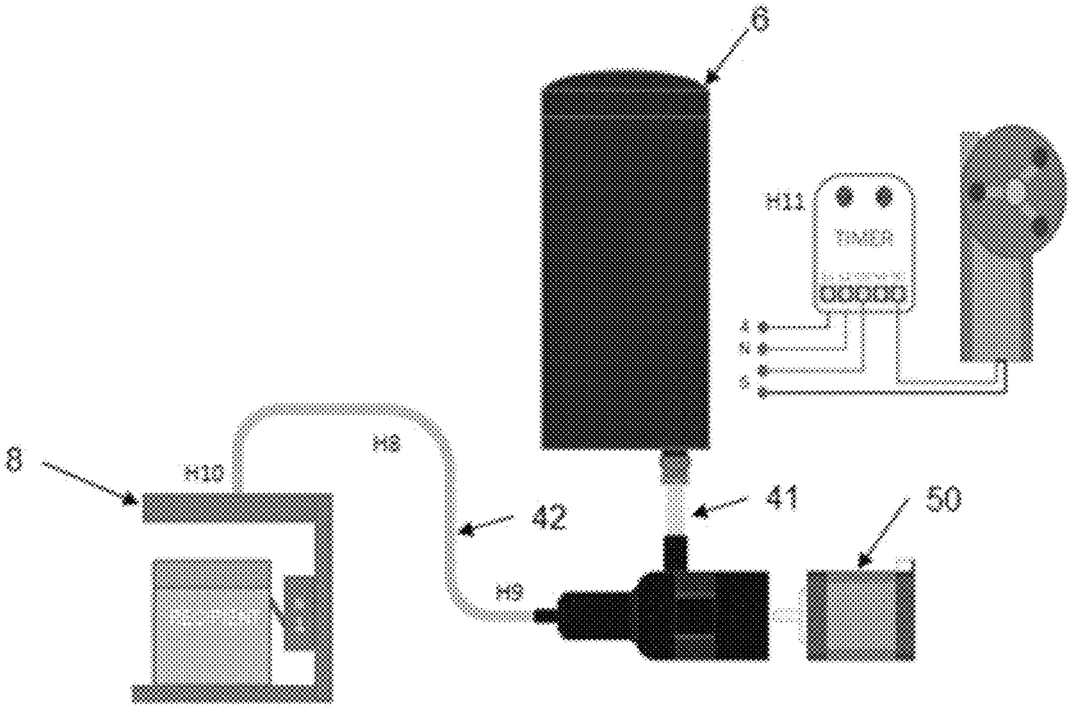
FIG. 17—diagram of the dispensing control of the receptacle.

According to FIGS. 16 and 17, the timer controlling the stirring receives the alternating current (H5), and marks the time between the stirring drives. The timer activates the motor (H7) using a relay, a 24V continuous voltage cable connects the source and the common input of the timer relay (COM). The stirring motor cable is connected to the normally closed (NC) of the timer relay, after the set time the timer activates the relay and powers the stirring motor for the programmed time and returns to the normal position.

The stirring motor (H11) is utilized for moving the mechanism that stirs the colorings. It has 2 drive cables, one of the cables is connected directly to the negative of the source, the second cable is connected to the NC pin of the stirring time relay.

FIG. 17 shows that the drive of the step motor is transmitted to the pump, which will suck the product through the corrugated tube of the canister and will feed it back to nozzle through the dispensing hose.

The system described, as a whole, brings to light an entirely unique arrangement—between electronic board, technology and quality of pumps, arrangement of the outlets, nozzle geometry and formats—which enabled its construction in compact form and guarantees its quality for small-volume dispensing, with precision, which, consequently, enables samples to be dispensed into small receptacles.

The invention claimed is:

1. An automatic dispensing system for liquid samples comprising:

at least one independently-driven hydraulic circuit, with various a plurality of canister reservoirs (6) with a lid (1) and pumps (50) which transfer paint to end reservoirs, wherein each of the canister reservoirs (6) has a pump (50), a tube (41) and a dispensing hose (42) which connects to the holes of a nozzle (8), under which there is positioned a paint reservoir and, in a front part of fairing, electric buttons are positioned to turn on and turn off and, also, an emergency button, an integrated electronic processing and communication device that receives electric power coming from a source and an electronic board (51) which manages a mechanism of a cup (47) and motors of each pump (50), precisely adjusting the quantity of fluid dosed and having a software residing in the board (51) which sends commands to the pumps (50), characterized in that the pumps (50) of each of the canister reservoirs (6) are of a progressive cavity type pump (50) and the tubes (41) are corrugated;

the nozzle (8) having a mechanism prescribing a semi-circular movement comprising a cup support (44), on which there are connected two straight joints of rear arms (12) and two straight joints of front rear arms (13), two right (11) and left (9) supports and a support cup (47), into which the canister (6) is fitted, comprising a sponge and a sealing ring (48) and a sponge cup (49);

a mechanism for eccentrically stirring the canisters (6) comprising a plate with various cutouts (14), the movement of which is driven by a continuous current stirring motor (43) with a pawl (18) on its shaft that tangentially pushes a pin (15) making it rotate;

the center of the bottom face of the canisters (6) having a hole with a thread where an inner tube (5) is vertically mounted having the same height as the canister (6) where a metal rod (7) is loosely mounted with a thread at the top end which is fastened onto a stirring blade (2);

the electronic board (51) manages closing sensors of the cup mechanism (47) and provides input for the sensors;

the software residing in the board (51) controls a man-machine interface (S1), a frontend (S2), a backend (S3), a calibration method (S4) of dispensing data and a communication means (S6) for sending to the control board (51).

2. The system of claim 1, wherein the software performs the calibration (S4) by interpolating the dispensing data selected from pulse, speed, acceleration, time, reverse pulses, ideal mass, measured mass and deviation.

3. The system of claim 1, wherein the communication (S6) of the backend (S3) with the control board (51) uses point-to-point topology.

4. The system of claim 3, wherein the communication (S6) of the backend (S3) with the control board (51) uses modbus RTU protocol.

5. The system of claim 1, further comprising a tablet that has a connection with the control boards (51) through wireless protocols, such as bluetooth and wi-fi.

6. The system of claim 1, wherein the electronic processing and communication device has a connection with the control boards (51) through USB cables.

7. The system of claim 6, wherein the electronic processing and communication device can be a tablet, a notebook or a mini PC.

8. The system of claim 1, wherein the control board (51) can carry out individual or simultaneous dispensing in more than one pump, pursuant to the dispatch of data from the backend—S3.

9. The system of claim 1, wherein the control board (51) utilizes specific drivers (H17) for controlling the movement of the pump motors.

10. The system of claim 1, further comprising an electronic device for determining the time it controls the stirring, receives the alternating current (H5), counts the time between the stirring drives, drives the motor (H7) using a relay, a continuous current 24V cable connects the source and a common input relay (COM), a stirring motor cable being connected to a normally closed (NC) of the relay when the time stipulated by the device has passed and drives the relay powering the stirring motor for the programmed time and returns to a normal position.

11. The system of claim 1, wherein the stirring motor (H11) is used to move a mechanism that stirs the dyes, having two drive cables, one of the cables is connected directly to the negative of the source, the second cable is connected to a normally closed pin of an electronic device relay for determining the stirring time.

12. The system of claim 1, wherein an electronic device for determining the time is a timer.

* * * * *